United States Patent
MacInnis

(10) Patent No.: US 8,863,134 B2
(45) Date of Patent: Oct. 14, 2014

(54) REAL TIME SCHEDULING SYSTEM FOR OPERATING SYSTEM

(75) Inventor: Alexander MacInnis, Ann Arbor, MI (US)

(73) Assignee: Broadcom Corporation, Irvine, CA (US)

( * ) Notice: Subject to any disclaimer, the term of this patent is extended or adjusted under 35 U.S.C. 154(b) by 2097 days.

(21) Appl. No.: 11/550,767

(22) Filed: Oct. 18, 2006

(65) Prior Publication Data

US 2007/0089114 A1 Apr. 19, 2007

Related U.S. Application Data

(60) Continuation-in-part of application No. 10/763,087, filed on Jan. 22, 2004, which is a division of application No. 10/322,059, filed on Dec. 17, 2002, now Pat. No. 6,721,837, which is a continuation of application No. 09/712,736, filed on Nov. 14, 2000, now Pat. No. 6,529,935, which is a continuation of application No. 09/437,209, filed on Nov. 9, 1999, now Pat. No. 6,189,064.

(60) Provisional application No. 60/728,094, filed on Oct. 18, 2005, provisional application No. 60/107,875, filed on Nov. 9, 1998.

(51) Int. Cl.
*G06F 9/46* (2006.01)
*G06F 9/48* (2006.01)
*G06F 9/50* (2006.01)
*G06F 13/18* (2006.01)

(52) U.S. Cl.
CPC ............ *G06F 9/4887* (2013.01); *G06F 9/5038* (2013.01); *G06F 9/50* (2013.01); *G06F 13/18* (2013.01); *G06F 9/4843* (2013.01)
USPC ............ 718/103; 718/100; 718/102; 718/104

(58) Field of Classification Search
CPC ....... G06F 9/50; G06F 9/5038; G06F 9/4887; G06F 13/18
See application file for complete search history.

(56) References Cited

U.S. PATENT DOCUMENTS

| | | | | |
|---|---|---|---|---|
| 6,112,023 A | * | 8/2000 | Dave et al. | 703/27 |
| 2003/0158987 A1 | * | 8/2003 | MacInnis et al. | 710/240 |
| 2004/0117577 A1 | * | 6/2004 | Bloks | 711/167 |

OTHER PUBLICATIONS

Brinkeley Sprunt ("Aperiodic task scheduling for real time systems", department of electrical and computer engineering, Aug. 1990, pp. 1-201).*

Choi et al ("Scheduling Aperiodic and Sporadic tasks in hard real-time systems" institute of advanced computer studies—university of Maryland; May 1997, pp. 1-26).*

* cited by examiner

*Primary Examiner* — Meng An
*Assistant Examiner* — Caroline H Arcos
(74) *Attorney, Agent, or Firm* — Foley & Lardner LLP

(57) ABSTRACT

In one embodiment of the present invention, there is presented computer readable media for servicing at least one task. The machine readable media stores a plurality of instructions, where the plurality of instructions further comprises an operating system. The operating system treats a first request from a task at a priority level associated with a real time application and treats subsequent requests from the task that occur within a predetermined amount of time after the first request at another priority level that is lower than the priority level associated with the task. In another embodiment, an operating system receives real time requirements from at least one task and determines whether it can assure the task of meeting its real time requirements.

13 Claims, 5 Drawing Sheets

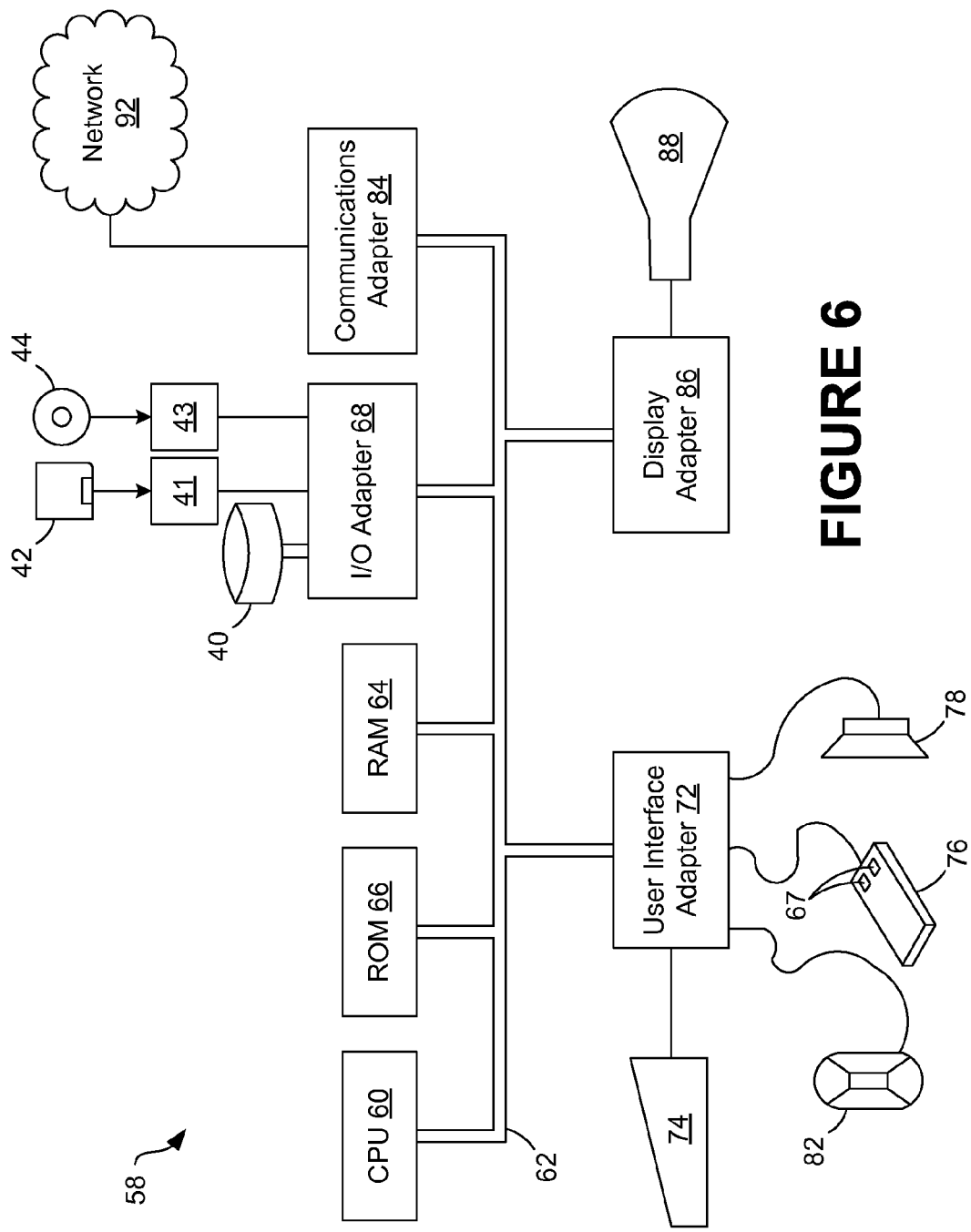

REAL TIME SCHEDULING SYSTEM FOR OPERATING SYSTEM

RELATED APPLICATIONS

This application claims priority under 35 U.S.C. 119(e) to "Real Time Scheduling System for Operating System", Provisional Application for Patent Ser. No. 60/728,094, filed Oct. 18, 2005 by MacInnis, which is incorporated herein by reference. This application is a continuation-in-part and claims priority to currently pending U.S. application Ser. No. 10/763,087 filed Jan. 22, 2004 which is a Division of U.S. patent application Ser. No. 10/322,059, published as U.S. Pat. Pub. No. 2003/0158987 and issued as U.S. Pat. No. 6,721,837, that is a continuation of U.S. patent application Ser. No. 09/712,736, filed Nov. 14, 2000, now U.S. Pat. No. 6,529,935, that is a continuation of U.S. patent application Ser. No. 09/437,209, now U.S. Pat. No. 6,189,064, that claims priority under 35 U.S.C. 119(e) to Provisional Patent Application 60/107,875.

This application is also related to U.S. Pat. No. 6,189,064, by MacInnis, which is incorporated herein by reference.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

A computer system often runs a number of different tasks during a particular period of time. The tasks can be associated with a variety of applications. The tasks operate using a variety of computer system resources. An operating system controls and provides access to many of the computer system resources, such as the memory system. The tasks can make requests for the computer system resources to the operating system.

The tasks can perform various functions, some of which may be real time. Functions that are performed in real time are usually associated with certain service requirements to meet real time deadlines. The service requirements are usually measured in the frequency of requests. Thus, the real time task needs a certain minimum number of requests to operate in real time. Other tasks may not operate in real time. Therefore, requests by these tasks can be serviced whenever the resources are available.

In practice, there are real time tasks that are measured for real time performance with an average response time over a longer time period. Additionally, the tasks may make, during shorter periods of time, more frequent requests. If these requests are all given high priority, the performance of other tasks may deteriorate.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Aspects of the present invention may be found in system(s), method(s), and apparatus for real time scheduling for an operating system, substantially as shown in and/or described in connection with at least one of the figures, as set forth more completely in the claims.

These and other advantages and novel features of the present invention, as well as illustrated embodiments thereof will be more fully understood from the following description and drawings.

BRIEF DESCRIPTION OF SEVERAL VIEWS OF THE DRAWINGS

FIG. 6 is a block diagram of an exemplary computer system wherein the present invention can be practiced.

DETAILED DESCRIPTION OF THE INVENTION

Figure 1:
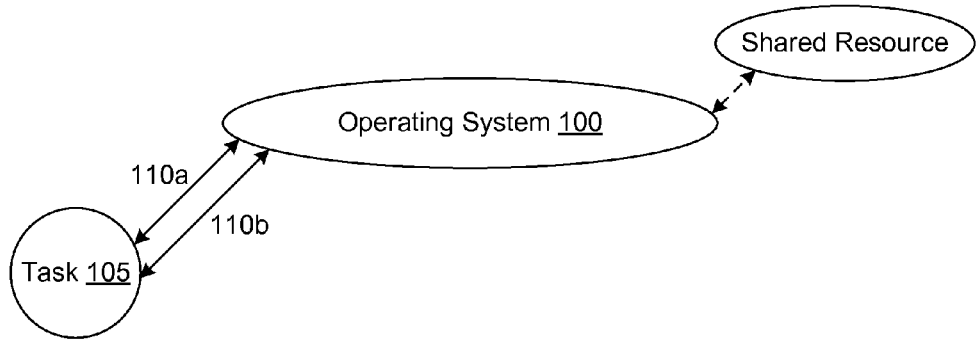
FIG. 1 is a block diagram an exemplary operating system servicing a task in accordance with an embodiment of the present invention.

Referring now to FIG. 1, there is illustrated a block diagram of an exemplary operating system 100 servicing a task 105 in accordance with an embodiment of the present invention. The operating system 100 controls and provides access to resources of a computer system.

For the performance of its functions, the task 105 makes requests. The requests can be to access certain shared resources, for example to execute software on a central processing unit. The operating system 100 services the requests. Because the resources may be shared by numerous tasks 105, it is possible for more than one request for the same resource to be made at substantially the same time. The foregoing is known as a resource contention.

A priority scheme is used to resolve a resource contention. The requests that are in contention may be associated with particular priority levels. The request with the higher priority level is serviced by the operating system 100.

The task 105 may require a certain degree of access to the shared resources, which may be measured in the frequency of accesses to the shared resources that are granted. A priority associated with the task 105 can be based on the requirements of the task 105. For example, the requirements of the task 105 may include the frequency at which it requests service, or the frequency with which it needs to be granted service in order to function correctly in real time.

However, in operation, the task 105 may make more frequent requests to access the shared resources. Additionally, the task 105 may also make more frequent requests to access the shared resources over shorter period of time. If all of the requests made by the task 105 have the same priority level associated with the task 105, the task 105 could severely limit access to the shared resources by other tasks.

Accordingly, the operating system 100 treats a limited number of requests 110a from task 105 at, or above, a particular priority level during a predetermined amount of time. The operating system 100 treats subsequent requests 110b from the task 105 that occur within the predetermined amount of time with a lower priority level.

In certain embodiments of the present invention, the operating system 100 may treat one request 110a from the task 105 at the priority level associated with the task 105 during the predetermined amount of time. All subsequent requests 110b during the predetermined amount of time can be treated with the lowest possible priority. The predetermined amount of time can be set, based on the task 105 access requirements.

Figure 2:
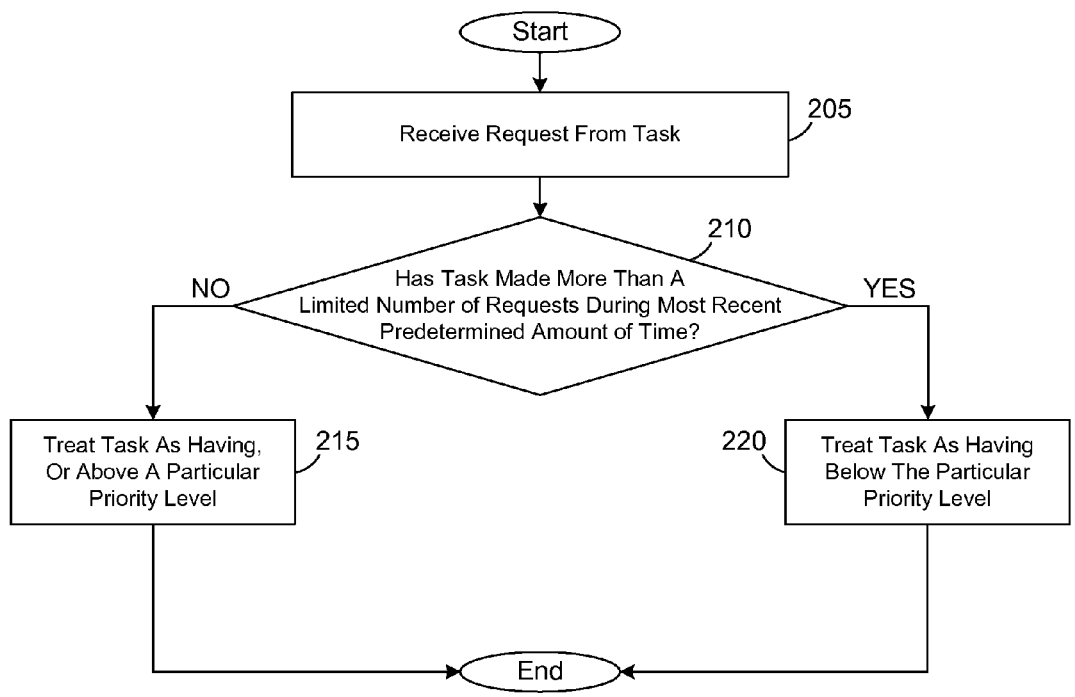
FIG. 2 is a flow chart for servicing a task in accordance with an embodiment of the present invention.

Referring now to FIG. 2, there is illustrated a flow diagram in accordance with an embodiment of the present invention. At 205, a request 110 for access from task 105 is received. At 210, a determination is made whether the task 105 has made more than the limited number of requests during the most recent predetermined amount of time.

If the task 105 has not made more than the limited number of requests during the most recent predetermined amount of time, the operating system 100 treats (215) the task as having or having above a particular priority level. If the task 105 has made more than the limited number of requests during the most recent predetermined amount of time, the operating system 100 treats (220) the task as having below the particular priority level for the duration of the predetermined amount of time, after which time the operating system 100 treats the task as having at least the first particular priority level.

Figure 3:
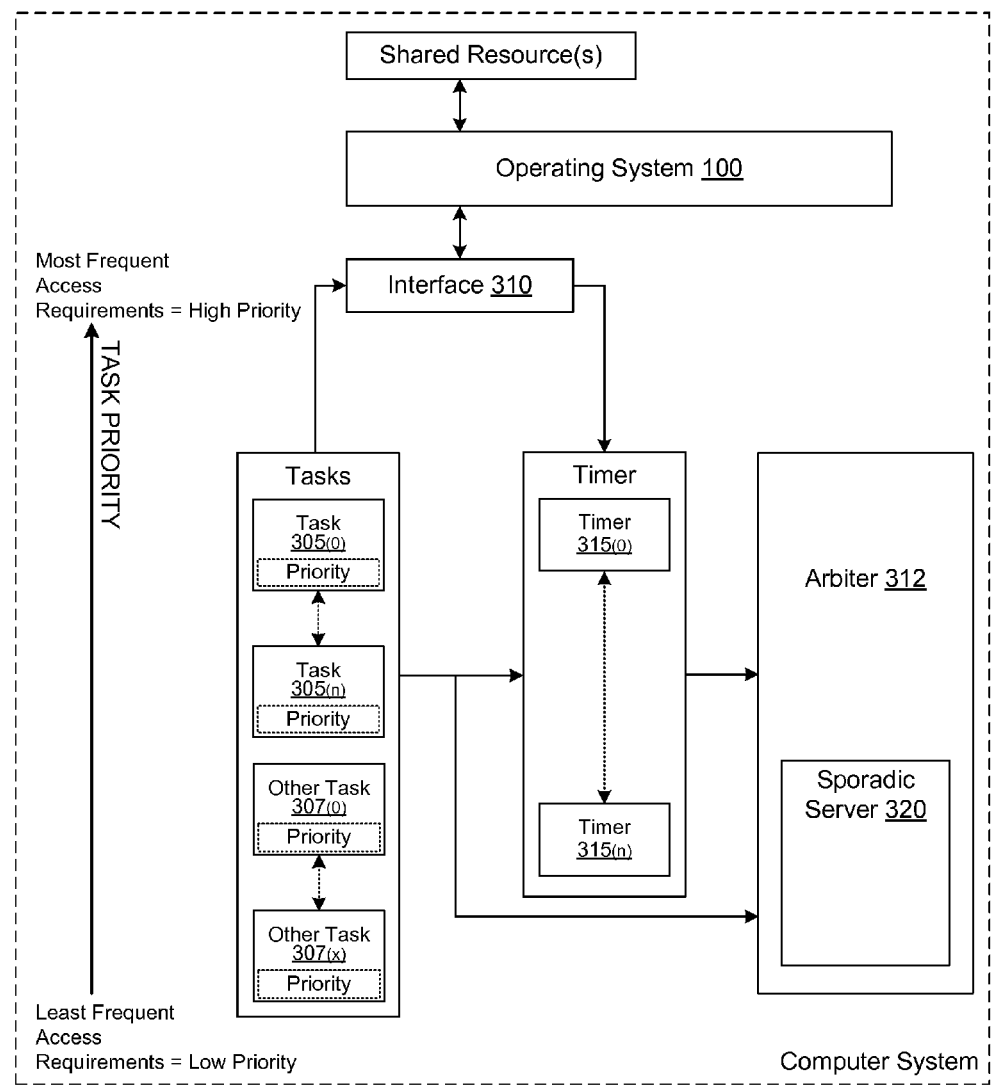
FIG. 3 is a block diagram of an exemplary operating system servicing a plurality of tasks in accordance with an embodiment of the present invention.

Referring now to FIG. 3, there is illustrated a block diagram of an exemplary operating system 100 servicing a plurality of real-time tasks 305(0) ... 305(n) and a plurality of other tasks 307(0) ... 307(x) in accordance with an embodiment of the present invention. The tasks 305 are capable of concurrent operation with respect to one another. In certain embodiments of the present invention, the tasks 305 can be associated with different application programs.

The real-time tasks 305 and other tasks 307 access certain required resources for the performance of their respective functions. Access to the required resources is provided and controlled by the operating system 100. The real-time tasks 305(0) ... 305(n) perform real time functions and have time deadlines. A deadline is generally considered to be a time by which a service is to be completed, after making a request, in order for the real time task to function correctly in real time. Accordingly, the real-time tasks 305(0) ... 305(n) may have access requirements that are measured by the frequency of access to the shared resources and by the durations for which they require access to the shared resources when they are granted access. The inverse of the frequency of requests may be referred to as a "period", and the duration of use of a shared resource may be referred to as a "load".

The other tasks 307(0) ... 307(x) may comprise tasks that do not perform real time functions and that do not have real time deadlines. Alternatively, the tasks 307(0) ... 307(x) may perform functions that have deadlines, but where such deadlines are significantly distant, such that the statistical likelihood that the tasks 307 will have access to the shared resources in order to meet their deadlines are a virtual certainty.

At deployment, the real-time tasks 305(0) ... 305(n) provide a real time scheduling interface 310 with access requirements. The real-time tasks 305(0) ... 305(n) can provide the access requirements in terms of request or service periods or minimum intervals, and in terms of duration of service for each access, or load. Alternatively, the real time tasks 305(0) ... 305(n) may provide access requirements in terms of deadlines. The deadlines are defined as the maximum amount of time that may occur between submission of a request and service of the request. The period is defined as the minimum interval between successive requests for service required for correct real time operation.

The real time scheduling interface 310 interacts with the operating system 100 to determine whether the operating system 100 can accommodate the real-time task's 305 access requirement. If the operating system 100 can accommodate the real-time task's 305 access requirement, the real-time scheduling interface 310 associates a priority for the real-time task 305. If the operating system determines that it cannot assure that it can accommodate the real time task's 305 access requirement, it informs task 305 that it cannot assure real time service to it. Task 305 may then take various actions, such as withdrawing its request, or making a different request with less demanding real time requirements. The priority associated with the task 305 is based on the access requirements of the tasks 305. The tasks 305 with the most frequent access requirements are provided the highest priority while the tasks 305 with the least frequent access requirements are afforded lower priorities. The priority levels that are associated with tasks 307 are lower than any of the priority levels associated with tasks 305.

The operating system 100 can determine whether it can meet the real time requirements of a task in a variety of ways. For example, in one embodiment, the operating system 100 performs a simulation of servicing all tasks, including the one requesting real time service, using the real time or non-real time requirements as appropriately associated with all of the tasks. The simulation starts from a theoretical worst case instance, and determines whether the deadlines of all tasks that have deadlines are met.

Certain embodiments may also incorporate the teachings described in U.S. Pat. No. 6,189,064 which is incorporated herein by reference.

An arbiter 312 receives the requests from the tasks 305 and tasks 307. The arbiter 312 resolves resource contention for the shared resources by selecting the request with the highest priority. However, in practice, many tasks 305 may make requests more frequently than their declared periods. Additionally, while a task 305 may, over a long period of time, make requests as frequently as its period, the task 305 may make more frequent requests over a shorter period of time. If left uncontrolled, a high priority task 305 could prevent other tasks 305 from meeting their deadlines.

The real time operating system interface 310 associates a timer 315(0) ... 315(n) with each one of the tasks 305(0) ... 305(n). The timers 315(0) ... 315(n) limit the frequency or minimum interval of requests that the tasks 305(0) ... 305(n) associated with the timers 315(0) ... 315(n) make with the priority associated with the task.

In certain embodiments of the present invention, the timers 315 allow the tasks 305 associated therewith to make one request with the priority associated with the time the task 305. After making the request with the priority associated with the task 305, the timer 315 counts down the minimum interval for the task 305 associated with the timer 315. While the timer 315 counts down the minimum interval associated for the task 305 associated with the timer 315, the timer 315 prevents the task 305 from making additional requests with the priority associated with the task 305.

Requests by the task 305 in excess of the limited number during the predetermined time period, or subsequent to the first request during the minimum interval, are treated as having priority levels that are lower than any of the priority levels that are associated with the tasks 305. Alternatively, the predetermined time period can be measured from the time that a request from the task 305 prevails at the arbiter 312. Alternatively, the predetermined time period can be measured starting from any time between the time of a request and the time the request is granted service. Once the timer completes counting down the minimum interval, the task 305 is again serviced with its assigned priority. At that time, any pending requests from task 305 that are currently treated as having a low priority level are treated as having the assigned or higher priority level.

The arbiter includes a sporadic server 320 that receives the requests from the tasks 307, and the requests from the tasks 305 that are in excess of the predetermined number. The sporadic server 320 can resolve resource contention among the requests in a variety of ways, for example, using a round robin scheme. The prevailing requests at the sporadic server 320 have a priority level that is lower than the priority levels associated with the tasks 305.

In certain embodiments of the present invention, the prevailing requests at the sporadic server 320 can have the lowest possible priority level.

In certain embodiments, if a real time task 305 that has been granted access to the shared resource continues to utilize the shared resource for more time than the task 305 declared to the real time scheduling interface 310, the arbiter 312 removes the grant from the task 305, so as to ensure that the real time operating system can meet its real time scheduling commitments to other tasks 305.

Figure 4:
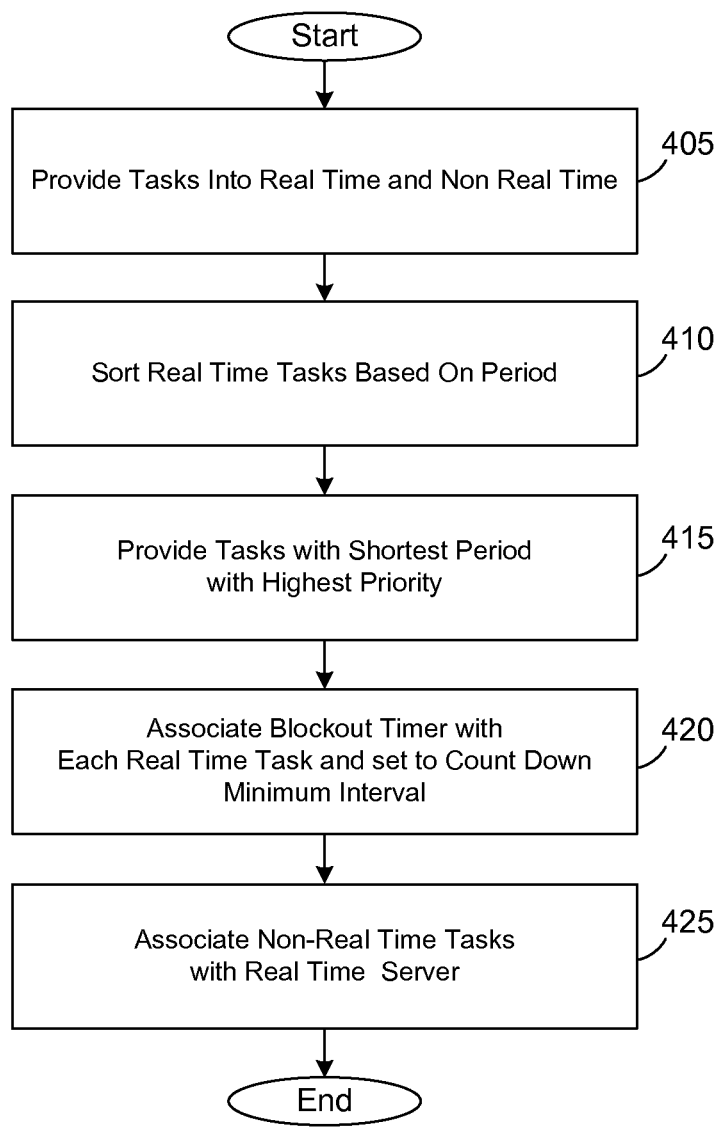
FIG. 4 is a flow diagram for prioritizing a plurality of tasks in accordance with an embodiment of the present invention.

FIG. 4 is a flow diagram for prioritizing a plurality of tasks in accordance with an embodiment of the present invention. At 405, the real time interface 310 divides all of the tasks that may access the shared resources into tasks that are real time tasks 305 and non-real time tasks.

At 410, the real time interface 310 sorts the real time tasks 305 based on the periods associated with the real time tasks 305. The real time interface 310 provides (415) tasks 305 that have the shortest period with the highest priority while providing the tasks 305 with the longest period with the lower priority.

At 420, the real time interface 310 associates a block out timer 310 with each real time task 305 that is set to count down the minimum interval associated with the task. The minimum interval may be the same as the period associated with the task 305, or may differ somewhat. At 425, the non-real time tasks are associated with lower priorities.

Figure 5:
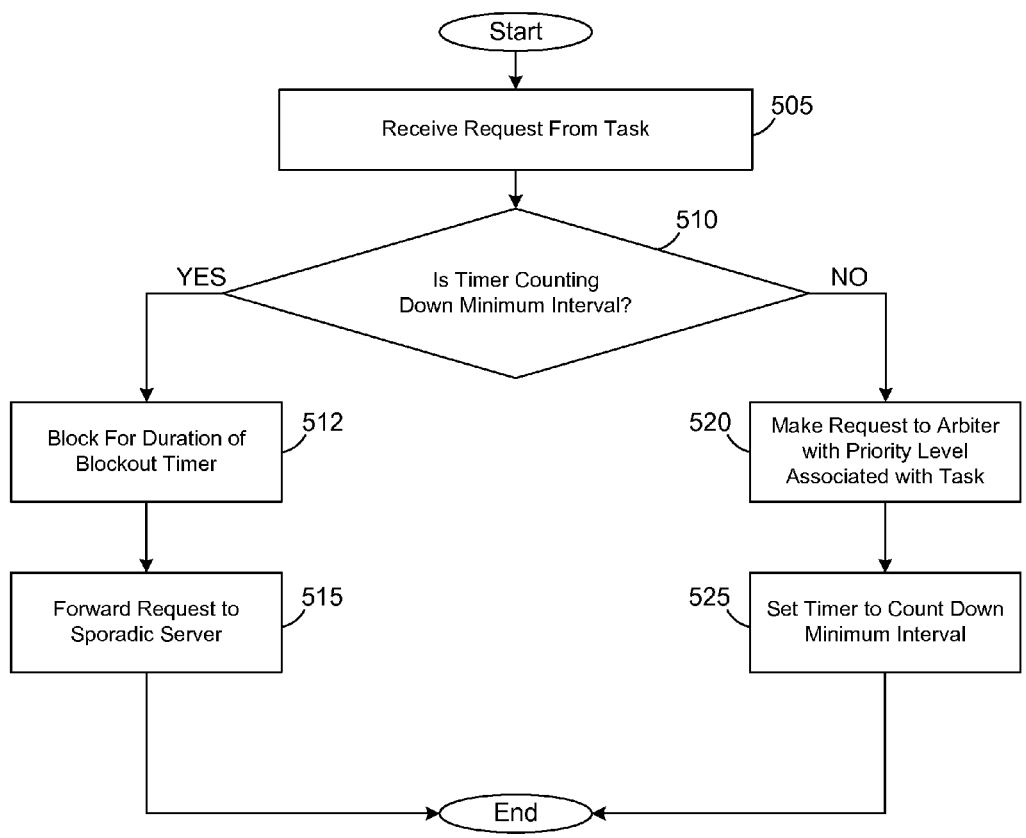
FIG. 5 is a flow chart for servicing a plurality of tasks in accordance with an embodiment of the present invention.

FIG. 5 is a flow diagram for servicing requests from tasks in accordance with an embodiment of the present invention. At 505, a request is received from a task 305. At 510, the block out timer 310 associated with the task 305 is examined to determine if the timer 310 is counting down the minimum interval associated with the task 305.

If at 510, the timer 310 is counting down the minimum interval associated with the task 305, the request is prevented from being made at the priority level associated with the task 305. At 512, the request is blocked for the balance of the interval remaining at timer 310. At 515, the request is forwarded to the sporadic server 320.

If at 510, the timer 310 is not counting down the minimum interval associated with the task, at 520, the request is made to the arbiter 312 at the priority level associated with the task 305. At 525, the timer 310 is set to count down the minimum interval.

FIG. 6 is a block diagram of an exemplary computer system 58 wherein the present invention can be practiced. A CPU 60 is interconnected via system bus 62 to random access memory (RAM) 64, read only memory (ROM) 66, an input/output (I/O) adapter 68, a user interface adapter 72, a communication adapter 84, and a display adapter 86. The input/output (I/O) adapter 68 connects peripheral devices such as hard disc drive 40, floppy disc drives 41 for reading removable floppy discs 42, and optical disc drives 43 for reading removable optical discs 44 (such as a compact disc or a digital versatile disc) to the bus 62. The user interface adapter 72 connects devices such as a keyboard 74, a mouse 76 having a plurality of buttons 67, a speaker 78, a microphone 82, and/or other interface devices such as a touch screen device (not shown) to the bus 62. The communications adapter 84 connects the computer system to a network 92. The display adapter 86 connects a monitor 88 to the bus 62.

The communications adapter 84 connects the computer system 58 to other computer systems 58 over network 92. The computer network 92 can comprise, for example, a local area network (LAN), a wide area network (WAN), a wi-fi network, or the Internet. Additionally, a particular one of the computer systems 58 can act as a server. A computer server centralizes files and functions and provides access to the file and functions to other computer systems 58 with the network 92.

One embodiment of the present invention can comprise sets of instructions resident in the random access memory 64 of one or more computer systems 58 configured generally as described in FIG. 6. Until required by the computer system 58, the sets of instructions may be stored in another computer readable memory, for example in a hard disc drive 40, or in removable memory such as an optical disc 44 or floppy disc 42. The term computer readable memory includes, but is not limited to the foregoing, or any combination thereof. Additionally, computer readable memory may include multiple optical discs 44 and/or floppy discs 42 that together form an economic unit.

It will be appreciated that the physical storage of the sets of instructions physically changes the medium upon which it is stored, electrically, magnetically, chemically, or mechanically, so that the medium carries computer readable information.

The embodiments described herein may be implemented as a board level product, as a single chip, application specific integrated circuit (ASIC), or with varying levels of the system integrated with other portions of the system as separate components. Alternatively, if the processor is available as an ASIC core or logic block, then the commercially available processor can be implemented as part of an ASIC device wherein certain aspects of the present invention are implemented as firmware.

The degree of integration may primarily be determined by speed and cost considerations. Because of the sophisticated nature of modern processors, it is possible to utilize a commercially available processor, which may be implemented externally to an ASIC implementation.

While the present invention has been described with reference to certain embodiments, it will be understood by those skilled in the art that various changes may be made and equivalents may be substituted without departing from the scope of the present invention.

Additionally, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

The invention claimed is:

1. A non-transitory computer-readable medium embodying a program executable in at least one device, comprising code that, when executed, causes the at least one device to:
communicate with an operating system executable in a memory of the at least one device to determine whether the operating system is able to accommodate an access requirement of at least one of a plurality of tasks;

associate a priority level with the at least one of the plurality of the tasks in response to the operating system being able to accommodate the access requirement of the at least one of the plurality of the tasks, wherein the priority level is determined utilizing an access requirement corresponding to the at least one of the plurality of the tasks;

associate a timer with the at least one of the tasks to permit the at least one of the plurality of the tasks to make a limited number of access requests to an arbiter at the priority level during a predefined time interval, wherein the timer is further employed to prevent the at least one of the plurality of the tasks from making a subsequent request to the arbiter at the priority level during the predefined time interval following the limited number of access requests at the priority level, and wherein the requests in excess of the limited number of access requests are treated by the arbiter as having a lower priority than the plurality of the tasks;

communicate with the arbiter to resolve a resource contention for a plurality of shared resources of the at least one device by selecting a request corresponding to a respective one of the plurality of the tasks having a highest priority; and communicate with a sporadic server of the arbiter, the sporadic server operable to arbitrate a plurality of requests made by the plurality of the tasks in excess of the limited number of access requests during the predefined time interval.

2. The non-transitory computer-readable medium of claim 1, wherein the at least one of the plurality of the tasks corresponds to a real-time application executable in the operating system.

3. The non-transitory computer-readable medium of claim 1, wherein the at least one of the plurality of the tasks corresponds to a non-real-time application executable in the operating system.

4. The non-transitory computer-readable medium of claim 1, wherein the operating system is operable to determine whether the access requirement is able to be accommodated for the at least one of the plurality of the tasks by performing a simulation of a servicing of the tasks.

5. A system comprising:
at least one device comprising a memory; and
a scheduling interface in communication with the at least one device, the scheduling interface operable to:
communicate with an operating system executable in a memory of the at least one device to determine whether the operating system is able to accommodate an access requirement of at least one of a plurality of tasks, wherein the access requirement comprises a maximum amount of time that may elapse between a request submission of a service of the at least one of the plurality of tasks;

associate a priority level with the at least one of the plurality of the tasks in response to the operating system being able to accommodate the access requirement of the at least one of the plurality of the tasks, wherein the priority level is determined utilizing an access requirement corresponding to the at least one of the plurality of the tasks;

associate a timer with the at least one of the tasks to permit the at least one of the plurality of the tasks to make a limited number of access requests to an arbiter at the priority level during a predefined time interval, wherein the timer is further employed to prevent the at least one of the plurality of the tasks from making a subsequent request to the arbiter at the priority level during the predefined time interval following the limited number of access requests at the priority level, and wherein the requests in excess of the limited number of access requests are treated by the arbiter as having a lower priority than the plurality of the tasks;

communicate with the arbiter to resolve a resource contention for a plurality of shared resources of the at least one device by selecting a request corresponding to a respective one of the plurality of the tasks having a highest priority; and communicate with a sporadic server of the arbiter, the sporadic server operable to arbitrate a plurality of requests made by the plurality of the tasks in excess of the limited number of access requests during the predefined time interval.

6. The system of claim 5, wherein the at least one of the plurality of the tasks corresponds to a real-time application executable in the operating system.

7. The system of claim 5, wherein the at least one of the plurality of the tasks corresponds to a non-real-time application executable in the operating system.

8. The system of claim 5, wherein the operating system is operable to determine whether the access requirement is able to be accommodated for the at least one of the tasks by performing a simulation of a servicing of the plurality of the tasks.

9. The system of claim 5, wherein the timer is further employed to permit the at least one of the tasks associated with the timer to make more requests during the predefined time interval than a respective one of the tasks having a priority lower than the priority of the at least one of the plurality of the tasks.

10. A method comprising:
communicating, by a scheduling interface, with an operating system executable in a memory of at least one device to determine whether the operating system is able to accommodate an access requirement of at least one of a plurality of tasks;

associating, by the scheduling interface, a priority level with the at least one of the tasks in response to the operating system being able to accommodate the access requirement of the at least one of the plurality of the tasks, wherein the priority level is determined utilizing an access requirement corresponding to the at least one of the tasks;

associating, by the scheduling interface, a timer with the at least one of the tasks to permit the at least one of the plurality of the tasks to make a limited number of access requests to an arbiter at the priority level during a predefined time interval, wherein the timer is further employed to prevent the at least one of the plurality of the tasks from making a subsequent request to the arbiter at the priority level during the predefined time interval following the limited number of access requests at the priority level, and wherein the requests in excess of the limited number of access requests are treated by the arbiter as having a lower priority than the tasks;

communicating, by the scheduling interface, with the arbiter to resolve a resource contention for a plurality of shared resources of the at least one device by selecting a request corresponding to a respective one of the plurality of the tasks having a highest priority; and communicating, by the scheduling interface, with a sporadic server of the arbiter, the sporadic server operable to arbitrate a plurality of requests made by the plurality of the tasks in excess of the limited number of access requests during the predefined time interval.

11. The method of claim 10, wherein the at least one of the plurality of the tasks corresponds to a real-time application executable in the operating system.

12. The method of claim 10, wherein the at least one of the plurality of the tasks corresponds to a non-real-time application executable in the operating system.

13. The method of claim 10, wherein the operating system is operable to determine whether the access requirement is able to be accommodated for the at least one of the plurality of the tasks by performing a simulation of a servicing of the tasks.

* * * * *